United States Patent Office 3,788,882
Patented Jan. 29, 1974

3,788,882
SYNTHETIC COMPOSITE AND PROCESS FOR PREPARING
Thomas M. Noone, Oak Park, Ill., assignor to The Richardson Company, Melrose Park, Ill.
No Drawing. Original application Feb. 18, 1970, Ser. No. 12,467, now Patent No. 3,674,547, dated July 4, 1972. Divided and this application June 23, 1972, Ser. No. 266,969
Int. Cl. B32b 27/40
U.S. Cl. 117—76 T
10 Claims

ABSTRACT OF THE DISCLOSURE

Breathable synthetic composites for articles of clothing including shoe uppers are provided by laminates composed of open-cell synthetic foams, a polyurethane film and a plasticizer which renders the synthetic composite resistant to liquid water transfer while allowing water-vapor transfer through the composite. A particularly useful composite comprises a polyvinyl chloride, open-cell foam and a thermoplastic polyurethane film containing a plasticizer such as tri-butoxyethyl phosphate to improve moisture-vapor transmission properties of the composite while maintaining a sufficient barrier to liquid water.

CROSS REFERENCE TO RELATED APPLICATIONS

This application is a divisional application of my previously filed application Ser. No. 12,467 filed on Feb. 18, 1970, issued July 4, 1972, as U.S. Pat. No. 3,674,547.

BACKGROUND

This invention relates to the preparation of breathable synthetic composites and more particularly to those composites having high moisture-vapor transfer properties while being essentially resistant to water transfer.

Synthetic composites are known for use in the manufacture of shoe uppers and various other articles of clothing and accessories. In a number of instances, they exhibit properties not always available from leather and other natural products.

However, previous breathable synthetic composites have not always been entirely satisfactory. There is a need for new materials which offer advantages in the trade.

SUMMARY

Briefly, my invention is directed to a breathable composite composed of an open-cell synthetic foam and on a surface thereof, a polyurethane layer or coating. Particularly useful foams are the open-cell vinyl halide polymers such as polyvinyl chloride. In addition, improved polyurethane films are provided by the incorporation of a plasticizer such as tributoxyethyl phosphate into the polyurethane.

DETAILED DECRIPTION

Useful open-cell synthetic foams for purposes of this invention include those composed of viny halide polymers, polystyrene, polyethylene, polyurethane, polyester and the like. Exemplary foams of this type are disclosed in U.S. Pat. 3,170,832, U.S. Pat. 3,288,729 and British Pat. 1,124,121. Advantageously, the foams are composed of vinyl polymers such as polystyrene, polyethylene, polyvinyl chloride and copolymers of viny choride, vinyl acetate and the like.

One method of preparing these foams is by beating air into plastisols containing surface active materials and heating the foamed plastisols to provide a cure and form open-cell foams. Plasticizers and other modifiers are combined with the polymer prior to foaming to improve various properties of the resultant foam.

Usually, the synthetic foam is prepared in sheet form and in some instances attached directly to a fabric backing. Various fabrics such as cotton, nylon, polyester and the like are useful for this purpose.

In addition to the open-cell synthetic foam, the composite of the invention includes a polyurethane layer or coating on the foam. Polyurethanes useful for this purpose include both thermoplastic and thermosetting materials as disclosed in U.S. Pat. 3,360,394. In a number of instances, thermoplastic polyurethanes are selected because they tend to have better surface properties for such purposes as embossing. Particularly useful thermoplastic polyurethanes are products known as Estane (B. F. Goodrich Chemical Company) which can be either polyester-urethane or polyether-urethane.

The composite can be prepared by first forming the polyurethane film and then spreading the foamed plastisol on the film and forming the open-cell foam in place. In this preparation, the polyurethane film is first formed on release paper, glass sheets, or the like. Usually, a plurality of coats are formed to produce a layer or film resistant to water transfer. Solvents such as toluene and dimethyl-formamide (DMF), and the like are used for coating purposes with the solvent being removed by heat at temperatures of about 150–250° F. after each coat.

The foamed plastisol is then placed on the polyurethane film and the open-cell foam formed and cured in place at temperatures sufficient to cure the foam. Usually, the temperature is about 300–450° F. and more usually about 350–400° F.

Another method of forming the composite is by first forming and curing the open-cell foam. Then the polyurethane film is applied to the foam.

Usually the first method is advantageous for articles of clothing since the polyurethane film can be first embossed with the desired surface characteristics.

Improved performance of the polyurethane as a moisture vapor transfer medium is accomplished through the use of a particular plasticizer or plasticizers. These are incorporated into the polyurethane in sufficient amounts to provide the desired improvement in moisture vapor transmission (MVT). Generally, the amount exceeds about 1 part per hundred parts of resin and more usually about 5–70 phr., although this range is somewhat dependent on the particular plasticizer and its compatibility with the particular polyurethane.

The incorporation of the plasticizer is carried out by adding the desired amounts to the polyurethane or by adding plasticizer to the plastisol before forming the open-cell foam on the polyurethane film. In the latter process, the plasticizer is transferred into the polyurethane and provides the desired results.

In general, not all plasticizers perform equally well. As an illustration, the use of 50 phr. of tricresyl phosphate in a thermoplastic polyester-urethane provides an MVT of about 223–233 while about 50 phr. of tri-butylphosphate in the same polyurethane provides an MVT of about 1046–1073. Generally, the improvement is provided by plasticizers which are compatible with the polyurethane in the desired amounts. Also, those having a solubility for water of at least 0.5 weight percent are particularly useful. Illustrative solubilities can be found in "Plasticizers and Phosphorus Chemicals" published by the Organic Chemicals Division of the FMC Corporation, 633 3rd Ave., New York, N.Y., 10017.

Suitable plasticizers include tri-butoxyethoxyethyl phosphate, tri-butoxyethyl phosphate, tributyl phosphate, tri-ethoxyethoxyethyl phosphate, di-ethoxyethoxyethyl phthalate, di-methoxyethyl phthalate, di-butoxyethyl phthalate, tricresyl phosphate, dioctyl phthalate, and the like with those with solubilities for water of at least 0.5 weight percent being preferred.

Advantageously, the composite of the open-cell foam and polyurethane film includes one or more plasticizers compatible in both layers of material. Particularly with polyvinyl chloride foam, I have found that the laminate formed with a plasticizer compatible with both the polyvinylchloride and polyurethane aids in the production of a laminate wherein the layers are permanently joined together to a degree not found with incompatible plasticizers. In some instances, it is often useful to provide an isocyanate in the polyurethane to produce an improved laminate of the polyvinylchloride and polyurethane.

In addition, various fillers, stabilizers, and other additives can also be incorporated into the composite materials. The amounts selected are well known to those versed in this art.

The composites of the invention not only possess a desirable permeability to air and water vapor, but they are practically impervious to water in the liquid phase. They offer advantages for shoe uppers and other articles of clothing apparel used in an environment of high moisture concentrations. The polyurethane, in addition, offers the advantages of appearance, wear and other benefits associated with polyurethanes.

The following examples illustrate some of the embodiments of this invention. It is to be understood that these are for illustrative purposes only and do not purport to be wholly definitive to conditions or scope.

EXAMPLE I

A composite was prepared from a thermoplastic polyurethane and polyvinylchloride open-cell foam. Initially, two individual coats of a polyether urethane (about 30 wt. percent solution in DMF-toluene) were formed on a glass plate (coated with a release agent). The first coat was prepared by spreading the solution using a Gardner knife set at about 6 mils and then dried at about 200° F. for about 3 minutes. The same procedure was followed for the second coat except for a Gardner knife setting of about 7 mils.

A polyvinylchloride foam was prepared by whipping air into a plastisol of the following formulation.

| Components: | Parts by weight |
| --- | --- |
| PVC (Geon 121) | 100 |
| Tri-butoxyethyl phosphate | 70 |
| Epoxy stabilizer | 5 |
| Vinyl stabilizer | 3 |
| Silicone surfactant | 12 |

The foam was spread on the dried polyether urethane film using a Gardner knife setting of about 50 mils. A cotton fabric (about 6.5 oz./yd.$^2$) was then laid on the wet foam and the entire laminate and glass plate were heated in an oven at about 380° F. for about 9 minutes.

The resultant composite was an open-cell polyvinylchloride foam between a fabric layer and a polyether-urethane film as the topskin. The composite was about 60 mils. In addition, the film contained about 25 phr. of plasticizer because of the migration of the tri-butoxyethyl phosphate into the urethane film.

The MVT (moisture vapor transmission) of the composite was measured by placing a sample over the opening of a glass bottle containing water. The sample was held by a cap whose center portion was removed to expose an area (about 2.8 in.$^2$) of the sample. The bottle was placed in a constant temperature water bath kept at about 90° F. The test results (loss in weight) represented grams/sq. meter/24 hrs. and were recorded for each hour over a period of about 5 hours. The results were as follows.

TABLE I

| Time: | MVT |
| --- | --- |
| 1st hr. | 250 |
| 2nd hr. | 317 |
| 3rd hr. | 346 |
| 4th hr. | 372 |
| 5th hr. | 384 |

EXAMPLE II

A similar composite to that in Example I was prepared from the same components except that dioctyl phthalate was substituted for the tri-butoxyethyl phosphate as the plasticizer and the thickness of the sample was about 52 mils. The MVT's obtained were as follows.

TABLE II

| Time: | MVT |
| --- | --- |
| 1st hr. | 115 |
| 2nd hr. | 110 |
| 3rd hr. | 113 |
| 4th hr. | 120 |
| 5th hr. | 125 |

EXAMPLES III–IX

Polyurethane films individually containing various plasticizers and laminated to cotton fabric were prepared by casting onto a glass plate. The thickness of the solution of polyester-urethane laid on the glass plate was controlled using a Gardner knife. The solvent was then removed by placing the glass plate and coating in an oven at about 200° F. for about 3 minutes. Two more coats of the solution were applied on top of the first coat and each coat was dried. A final coat of the polyester-urethane solution was applied and while this was still wet, a light weight (3 oz./sq. yd.) cotton fabric was laid onto this wet layer. The glass plate was then placed into the oven at 200° F. for 3 minutes to remove the solvent.

TABLE III.—MVT VALUES

| | | Weight percent | | | |
| --- | --- | --- | --- | --- | --- |
| Ex. | Plasticizer | 0 | 7.5 | 25 | 50 |
| | None | 146–166 | | | |
| 3 | Tri-butoxyethyl phosphate | | | 540–624 | 902–910 |
| 4 | Tributyl phosphate | | | | 1,046–1,073 |
| 5 | Di-ethoxyethoxy ethyl phthalate | | | 454–514 | 706–818 |
| 6 | Di-methoxyethyl phthalate | | | 542–569 | 914–970 |
| 7 | Di-butoxyethyl phthalate | | | 425–442 | |
| 8 | Tricesyl phosphate | | | | 223–233 |
| 9 | Dioctyl phthalate | | | 161–170 | |

EXAMPLE X

The composite as described in Examples III–IX was prepared except that the polyurethane was a thermosetting resin (Verona dyestuffs). The results of MVT tests are in Table IV below.

TABLE IV.—MVT VALUES

| Example | Plasticizer | 0 | 25 | 50 |
| --- | --- | --- | --- | --- |
| 10 | Tri-butoxyethyl phosphate | | 466–518 | 799–850 |

EXAMPLES XI–XII

The composite as described in Examples III–X was prepared except that the polyurethane was a thermoplastic polyether-urethane. The results of MVT tests are in Table V below.

TABLE V.—MVT VALUES

| | | | Weight percent | |
| --- | --- | --- | --- | --- |
| Example | Plasticizer | 0 | 25 | 50 |
| | None | 211–214 | | |
| 11 | Tri-butoxyethyl phosphate | | 365–403 | 523–547 |
| 12 | Dioctyl phthalate | | 248–254 | 228–250 |

While the invention has been described in conjunction with specific examples thereof, these are illustrative only.

Accordingly, many alternatives, modification, and variations will be apparent to those skilled in the art in the light of the foregoing description, and it is therefore intended to embrace all such alternatives, modification, and variations as to fall within the spirit and broad scope of the appended claims.

I claim:

1. A composite material characterized as impermeable to liquid water passage but having high moisture-vapor transfer properties, said material comprising a layer of an open-cell synthetic resin foam having two surfaces, attached to one surface thereof a layer of liquid water resistant polyurethane film containing a plasticizer in an amount sufficient to provide moisture-vapor transfer properties therethrough and attached to the other surface of the foam, a fabric layer.

2. The composite material of claim 1 wherein the polyurethane film contains a plasticizer which has a solubility for water of at least about 0.5 weight percent.

3. The composite material of claim 1 wherein the plasticizer is present in the composite an amount of from about 1 to 70 weight percent of the polyurethane film.

4. The composite material of claim 3 wherein plasticizer is present in the foam.

5. The composite material of claim 1 wherein the open-cell synthetic resin foam is a polyvinyl chloride foam.

6. The composite material of claim 1 wherein the polyurethane film is a thermoplastic resin based on the polyester, the plasticizer is tributoxyethyl phosphate and is present in an amount of from about 5 to 70 weight percent based on the polyurethane film.

7. The composite material of claim 6 wherein the open-cell synthetic resin foam is a polyvinyl chloride foam.

8. A process for preparing a composite material resistant to liquid water transfer but with high moisture-vapor transfer properties, which process comprises forming an open-cell polyvinyl chloride plastisol foam on a fabric backing material, applying a polyurethane coating containing a plasticizer in an amount sufficient to provide moisture-vapor transfer properties therethrough on the exposed surface of the foam opposite the fabric and curing the resulting combination at curing conditions.

9. The process of claim 8 wherein the plasticizer has a solubility for water of at least about 0.5 weight percent.

10. The process of claim 8 wherein the plasticizer is present in an amount of from about 1 to 70 weight percent of the polyurethane film.

References Cited

UNITED STATES PATENTS

| | | | |
|---|---|---|---|
| 2,955,056 | 10/1960 | Knox | 117—98 |
| 3,173,150 | 3/1965 | Mohler | 117—138.8 D X |
| 3,130,505 | 4/1964 | Markevitch | 161—159 X |
| 2,983,962 | 5/1961 | Merz et al. | 161—159 X |

RALPH HUSACK, Primary Examiner

U.S. Cl. X.R.

117—98, 135.5; 156—309; 161—88, 159, 190; 260—2.5 P, 30.6 R

UNITED STATES PATENT OFFICE
CERTIFICATE OF CORRECTION

Patent No. 3,788,882                           Dated January 29, 1974

Inventor(s) Thomas M. Noone

It is certified that error appears in the above-identified patent and that said Letters Patent are hereby corrected as shown below:

Column 1, line 61 the word "viny" should be "vinyl"

Column 1, line 67 the word "viny" should be "vinyl"

Column 4, line 59 in Table IV "799-850" should be "799-859"

Signed and sealed this 3rd day of December 1974.

(SEAL)
Attest:

McCOY M. GIBSON JR.                 C. MARSHALL DANN
Attesting Officer                   Commissioner of Patents